(12) United States Patent
Seol

(10) Patent No.: US 12,415,743 B2
(45) Date of Patent: Sep. 16, 2025

(54) SYNTHETIC QUARTZ GLASS MANUFACTURING METHOD THROUGH OVD PROCESS WITH IMPROVED DEPOSITION EFFICIENCY

(71) Applicant: BCnC Co., Ltd., Icheon-si (KR)

(72) Inventor: Changwook Seol, Pyeongtaek-si (KR)

(73) Assignee: BCnC Co., Ltd., Icheon-si (KR)

( * ) Notice: Subject to any disclaimer, the term of this patent is extended or adjusted under 35 U.S.C. 154(b) by 327 days.

(21) Appl. No.: 17/895,358

(22) Filed: Aug. 25, 2022

(65) Prior Publication Data

US 2023/0159371 A1    May 25, 2023

(30) Foreign Application Priority Data

Nov. 25, 2021   (KR) ........................ 10-2021-0164480

(51) Int. Cl.
  *C03C 23/00*    (2006.01)
  *C03B 37/014*   (2006.01)

(52) U.S. Cl.
  CPC .. *C03B 37/01446* (2013.01); *C03B 37/01493* (2013.01)

(58) Field of Classification Search
  CPC .... C03B 19/14; C03B 37/014; C03B 2207/70
  See application file for complete search history.

(56) References Cited

U.S. PATENT DOCUMENTS

| | | | | |
|---|---|---|---|---|
| 2005/0000251 A1* | 1/2005 | Dabby | .............. | C03B 37/01486 65/421 |
| 2006/0207295 A1* | 9/2006 | Huenermann | .... | C03B 37/01486 65/421 |

FOREIGN PATENT DOCUMENTS

| | | | | | |
|---|---|---|---|---|---|
| CN | 112624599 | A | * | 4/2021 | |
| DE | 19628958 | A1 | * | 1/1998 | ......... C03B 19/1423 |
| EP | 1440949 | B1 | * | 3/2006 | ....... C03B 37/01413 |
| JP | H11343136 | A | * | 12/1999 | ......... C03B 37/0148 |
| JP | 2000143276 | A | * | 5/2000 | ......... C03B 37/0142 |
| JP | 2001039725 | A | * | 2/2001 | ......... C03B 37/0142 |
| JP | 2002154827 | A | * | 5/2002 | ......... C03B 19/1423 |
| JP | 2004269284 | A | * | 9/2004 | ......... C03B 37/0148 |
| JP | 2005139042 | A | * | 6/2005 | ....... C03B 37/01486 |
| JP | 2006008438 | A | * | 1/2006 | ....... C03B 37/01486 |

(Continued)

*Primary Examiner* — Erin Snelting
*Assistant Examiner* — Steven S Lee
(74) *Attorney, Agent, or Firm* — NKL Law; Jae Youn Kim

(57) ABSTRACT

A method of manufacturing synthetic quartz glass through an outside vapor deposition (OVD) process with improved deposition efficiency. When a hollow cylindrical synthetic quartz glass product is manufactured through an OVD method or the like, it is environmentally friendly in view of using a smaller amount of chlorine and is economical in view of requiring no separate treatment equipment, as compared to a conventional technique using silicon chloride ($SiCl_4$). Also, the method, in which octamethylcyclotetrasiloxane is supplied to a deposition burner while being sprayed in the form of a droplet along with a high-pressure carrier gas and vaporized by the deposition burner, can effectively address the high-temperature heating and slow decomposition involved when octamethylcyclotetrasiloxane ($[(CH_3)_2SiO]_4$) is used as a source for depositing silicon dioxide particles.

3 Claims, 3 Drawing Sheets

(56) References Cited

FOREIGN PATENT DOCUMENTS

| KR | 20000013544 A | * | 3/2000 | ............ | C03B 37/012 |
| WO | WO-9902459 A1 | * | 1/1999 | ......... | C03B 19/1415 |

* cited by examiner

Example of burner structure and input gas

SYNTHETIC QUARTZ GLASS MANUFACTURING METHOD THROUGH OVD PROCESS WITH IMPROVED DEPOSITION EFFICIENCY

CROSS-REFERENCE TO RELATED APPLICATION

This application claims priority to and the benefit of Korean Patent Application No. 10-2021-0164480 filed on Nov. 25, 2021, the disclosure of which is incorporated herein by reference in its entirety.

BACKGROUND

1. Field of the Invention

The present invention relates to a method of manufacturing synthetic quartz glass through an OVD process with improved deposition efficiency.

2. Discussion of Related Art

Silica glass or quartz glass, which is widely used in optical, semiconductor, and chemical industries, is glass made only of pure $SiO_2$, that is, glass including several hundreds of ppm or less of impurities. $SiO_2$, which is called silica, is divided into various types according to a crystal form. However, since the representative type of $SiO_2$ that is present in nature is quartz, high-purity $SiO_2$ glass is called quartz glass.

Quartz glass may be classified into fused quartz glass and synthetic quartz glass according to a manufacturing method. Fused quartz glass is manufactured by melting natural quartz or quartz sand at high temperature, whereas synthetic quartz glass is manufactured by a chemical vapor deposition method, an alkoxide method, or the like using a Si-containing gas- or liquid-phase compound such as high-purity silicon chloride ($SiCl_4$) or the like as a raw material. Synthetic quartz glass has a wider range of applications due to having a low impurity content compared to when quartz or quartz sand is used.

Meanwhile, as methods of manufacturing synthetic quartz glass, vapor-phase axial deposition (VAD), outside vapor deposition (OVD), or plasma outside deposition (POD), and the like are known, and specifically, synthetic quartz glass is manufactured by manufacturing a hollow porous quartz glass base material (soot body) using high-purity silicon chloride ($SiCl_4$) or the like and sintering the soot body. According to the OVD method and the like, a soot body is manufactured by depositing fine $SiO_2$ particles on the outer surface of a mandrel rotating about the longest diameter in the ellipse through flame hydrolysis or pyrolysis of a silicon-containing raw material. The manufactured soot body is subjected to dehydration/sintering processes to form synthetic quartz glass.

Meanwhile, silicon chloride ($SiCl_4$), which is conventionally used as a source for manufacturing quartz glass, has problems in that efficiency is low due to a low silicon (Si) content in the molecule, a large amount of chlorine (Cl) and chlorine-containing gas is generated to cause difficulty in processing, and complex treatment facilities are required to handle this.

SUMMARY OF THE INVENTION

The present invention is directed to providing a method of manufacturing synthetic quartz glass using octamethylcyclotetrasiloxane ($[(CH_3)_2SiO]_4$) as a source for depositing silicon dioxide particles, which is environmentally friendly in view of using a smaller amount of chlorine and does not require separate treatment equipment in manufacture of a hollow cylindrical synthetic quartz glass product through an outside vapor deposition (OVD) method or the like, as compared to a conventional technique.

The present invention is also directed to providing a method of manufacturing synthetic quartz glass, in which a halogen element-containing gas is sprayed along with a raw material gas or sprayed inside a deposition chamber so that the high-temperature heating and slow decomposition involved when octamethylcyclotetrasiloxane ($[(CH_3)_2SiO]_4$) is used as a source for depositing silicon dioxide particles are effectively addressed.

However, technical problems to be solved by the present invention are not limited to the technical problems described above, and other technical problems not disclosed herein will be clearly understood from the following description by those skilled in the art.

One aspect of the present invention provides a method of manufacturing synthetic quartz glass, which includes depositing silicon dioxide ($SiO_2$) particles on the outer surface of a cylindrical mandrel rotating about a longitudinal or lateral axis to form a porous hollow cylindrical soot body and sintering the soot body to manufacture synthetic quartz glass, wherein octamethylcyclotetrasiloxane ($[(CH_3)_2SiO]_4$) is used as a source for depositing silicon dioxide particles during the deposition process, and a halogen element-containing gas is further used to promote decomposition of the source.

In an embodiment, the octamethylcyclotetrasiloxane may be supplied to a deposition burner while being sprayed in the form of a droplet through a high-pressure carrier gas, and vaporized by the deposition burner.

In an embodiment, the carrier gas may have a pressure range of 1 to 20 SLM (standard liter per minute).

In an embodiment, the halogen element-containing gas may be a chlorine (Cl)-containing gas, and the chlorine-containing gas may be supplied in an amount of 0.1 to 10 parts by weight relative to 100 parts by weight of the octamethylcyclotetrasiloxane.

In an embodiment, the chlorine (Cl)-containing gas may be hydrogen chloride (HCl) or chlorine ($Cl_2$) gas.

Another aspect of the present invention provides an apparatus for manufacturing synthetic quartz glass utilizing the above-described method, which includes: a temperature measuring instrument provided above a mandrel deposition surface on which silicon dioxide ($SiO_2$) is deposited; a preheating burner provided on the side of the mandrel deposition surface; and a deposition burner provided below the mandrel deposition surface, wherein at least one component selected from the temperature measuring instrument, preheating burner, and deposition burner moves at a predetermined interval, and the independent control of each component with respect to a position is possible to uniformly control the temperature of the mandrel deposition surface, and the deposition burner includes a line mixing console for supplying octamethylcyclotetrasiloxane ($[(CH_3)_2SiO]_4$) in the form of a droplet as a silicon dioxide source.

In an embodiment, the positions of the temperature measuring instrument and the preheating burner may be controlled so that they move at predetermined intervals in consideration of at least one factor selected from the diameter of the deposition surface, the rotation speed of a mandrel, and the movement speed of the deposition burner, and thus the temperature of the deposition surface may be uniformly controlled.

In an embodiment, the preheating burner may uniformly control the temperature of the deposition surface by receiving a temperature value measured with the temperature measuring instrument, calculating a difference from a predetermined target value, and controlling the flow rate of combustion gas based on the difference.

In an embodiment, the mandrel may be made of one or more materials selected from stainless steel (SUS), titanium, nickel, Inconel, Hastelloy, and a combination thereof.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
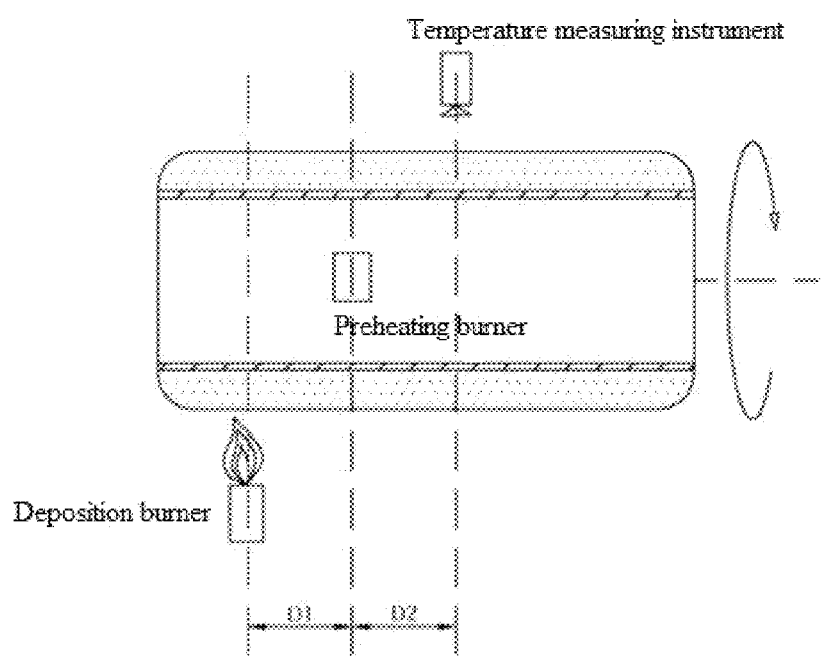
FIG. 1 is a schematic diagram of an apparatus for manufacturing synthetic quartz glass according to an embodiment of the present invention.

Hereinafter, exemplary embodiments of the present invention will be described in detail with reference to the accompanying drawings so that those skilled in the art can easily carry out the present invention. However, the present invention may be embodied in several different forms, and therefore, is not limited to embodiments described herein. Also, in the drawings, descriptions of parts unrelated to the detailed description are omitted to clearly describe the present invention. Like numbers refer to like elements, and descriptions of the same elements will be not reiterated.

Objects and effects of the present invention can be naturally understood or made clearer by the following description, and the objects and effects of the present invention are not limited by the following description. In the following description of the present invention, when a detailed description of the related art is determined to unnecessarily obscure the subject matter of the present invention, the detailed description will be omitted. Hereinafter, exemplary embodiments of the present invention will be described in detail with reference to the accompanying drawings.

A method of manufacturing synthetic quartz glass according to an embodiment of the present invention includes depositing silicon dioxide ($SiO_2$) particles on the outer surface of a cylindrical mandrel rotating about a longitudinal or lateral axis to form a porous hollow cylindrical soot body and sintering the soot body to manufacture synthetic quartz glass, wherein octamethylcyclotetrasiloxane ($[(CH_3)_2SiO]_4$) is used as a source for depositing silicon dioxide particles during the deposition process, and a halogen element-containing gas is further used to promote decomposition of the source.

Figure 2:
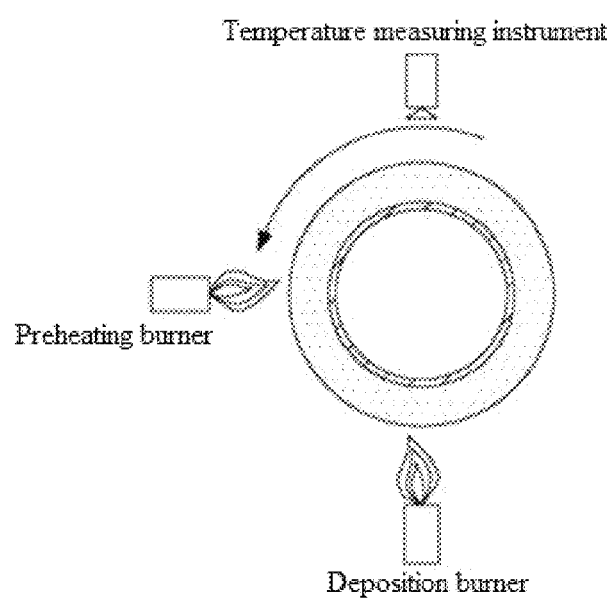
FIG. 2 is a side view of the apparatus for manufacturing synthetic quartz glass of FIG. 1.

Meanwhile, an apparatus for manufacturing synthetic quartz glass utilizing the above-described method according to an embodiment of the present invention includes: a temperature measuring instrument provided above a mandrel deposition surface on which silicon dioxide ($SiO_2$) is deposited, a preheating burner provided on the side of the mandrel deposition surface, and a deposition burner provided below the mandrel deposition surface (see FIGS. 1 and 2).

Figure 3:
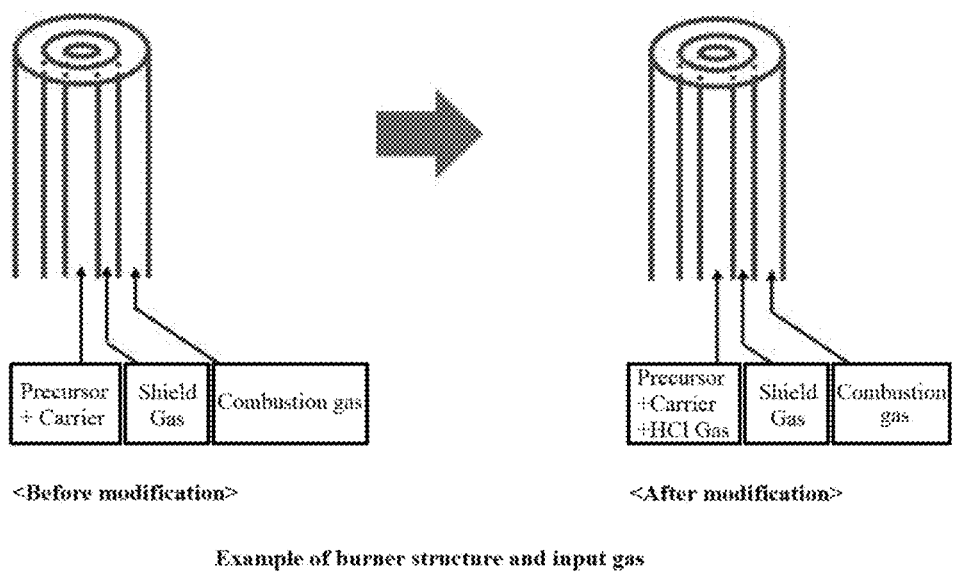
FIG. 3 is a schematic diagram showing a deposition burner to which octamethylcyclotetrasiloxane is supplied, a flow (left) in which a carrier gas and octamethylcyclotetrasiloxane in the form of a droplet are input into the burner, and a flow (right) in which a chlorine-containing gas (e.g., hydrogen chloride (HCl)) is further input in a method of manufacturing synthetic quartz glass according to an embodiment of the present invention.

In addition, at least one component selected from the temperature measuring instrument, preheating burner, and deposition burner moves at a predetermined interval, and the independent control of each component with respect to a position is possible to uniformly control the temperature of the mandrel deposition surface, and the deposition burner includes a line mixing console for supplying octamethylcyclotetrasiloxane ($[(CH_3)_2SiO]_4$) in the form of a droplet as a silicon dioxide source (see FIG. 3).

Additionally, to promote decomposition of octamethylcyclotetrasiloxane, spraying along with a halogen element-containing gas or deposition under an atmosphere including a halogen element-containing gas may be performed.

Specifically, the apparatus for manufacturing synthetic quartz glass according to the present invention may be provided in a crucible and may include a mandrel rotating about a longitudinal or lateral axis, a temperature measuring instrument provided above the deposition surface of the mandrel, a preheating burner provided on the side of the mandrel deposition surface, and a deposition burner provided below the mandrel deposition surface.

The mandrel is a component configured to form a hollow cylindrical soot body by depositing a silicon dioxide raw material on the deposition surface, which is outer surface, of the mandrel and may be provided to be rotatable 3600 to one side about the axis. Meanwhile, the mandrel according to an embodiment of the present invention may be made of one or more materials selected from stainless steel (SUS), titanium, nickel, Inconel, and a combination thereof, and specifically, the material may be made of stainless steel.

According to a conventional technique, a mandrel made of a ceramic such as alumina or silicon carbide having oxidation resistance was used in the deposition process in the manufacture of synthetic quartz glass through an OVD method or the like. However, since alumina and silicon carbide are relatively expensive ceramic materials and very vulnerable to thermal shock, there is a risk of damage caused by thermal shock during a process using a flame. Also, due to the problem of releasability, when the mandrel and a deposited material are separated after the completion of the deposition process, there is a risk of damage to the mandrel or the deposited material.

Meanwhile, when the mandrel is made of one or more materials selected from stainless steel (SUS), titanium, nickel, Inconel, and a combination thereof, specifically, stainless steel as in the present invention, the mandrel is able to be used in a temperature range of 800 to 1,400° C. which is a $SiO_2$ deposition temperature range and has high resistance to thermal shock and less risk of damage, the natural separation of the mandrel and a deposited material is possible due to a difference in the coefficient of thermal expansion during cooling, and the physical adhesion between the mandrel and the deposited material is effectively blocked due to a release layer made of a specific material to effectively prevent damage to the mandrel or the deposited material when they are separated.

Meanwhile, the temperature measuring instrument may be provided above a mandrel deposition surface on which silicon dioxide ($SiO_2$) is deposited and may be configured to detect and digitize a temperature and deliver the result to a preheating burner. Meanwhile, the temperature measuring instrument may be controlled so that it moves at a predetermined interval in consideration of at least one factor selected from the diameter of the deposition surface, the rotation speed of the mandrel, and the movement speed of a deposition burner, and may also be provided so that the independent control thereof with respect to a position is possible to uniformly control the temperature of a deposition surface.

Meanwhile, the preheating burner may be provided on the side of a mandrel deposition surface to uniformly control the temperature of the deposition surface, and as necessary, one or more preheating burners may be provided. Meanwhile, like the temperature measuring instrument, the preheating burner may be controlled so that it moves at a predetermined interval in consideration of at least one factor selected from the diameter of the deposition surface, the rotation speed of the mandrel, and the movement speed of a deposition burner, and may be provided so that the independent control thereof with respect to a position is possible to uniformly control the temperature of a deposition surface.

Specifically, the preheating burner may be configured to uniformly control the temperature of a deposition surface by receiving a temperature value measured with the temperature measuring instrument, calculating a difference from a predetermined target value, and controlling the flow rate of a combustion gas based on the difference.

Meanwhile, the deposition burner may be provided below a mandrel deposition surface to smoothly perform the deposition of silicon dioxide particles and may also be provided so that it is movable at a predetermined interval and the independent control thereof with respect to a position is possible.

Meanwhile, the manufacturing apparatus according to the present invention may be controlled so that, when the deposition burner moves a predetermined distance, the temperature measuring instrument and the preheating burner also move in proportion thereto.

Specifically, when pores are included in synthetic quartz glass, the corresponding part is defective, and thus the use thereof is not possible. Therefore, it is necessary to suppress the generation of pores as much as possible. Pores may be generated by various causes, and when deposition is made with non-uniform density, pore generation is substantially increased. Accordingly, effectively controlling density during deposition is believed to be important for pore suppression. Meanwhile, since density is closely related to temperature during deposition, it is necessary to uniformly maintain the temperature of a deposition surface.

When a diameter is small at the early stage of deposition, the contact time with a flame is long, so it is easy to uniformly maintain the temperature of a deposition surface. However, as a diameter gradually increases, the contact time with the flame becomes shorter relative to the total area, so it is difficult to uniformly maintain the temperature. In order to solve the problem, in the present invention, a temperature measuring instrument capable of measuring the temperature of a deposition surface and a preheating burner for heating a deposition surface may be provided.

Meanwhile, the temperature of a deposition surface may be uniformly maintained by increasing or decreasing the flow rate of a heat source (e.g., combustion gas) for the preheating burner based on a temperature value measured with the temperature measuring instrument. Accordingly, uniform density may be ensured, and the formation of pores may be minimized.

In the method of manufacturing synthetic quartz glass according to an embodiment of the present invention, silicon dioxide ($SiO_2$) particles are deposited on the outer surface of a cylindrical mandrel rotating about a longitudinal or lateral axis to form a porous hollow cylindrical soot body, and the soot body is sintered to manufacture synthetic quartz glass using the above-described manufacturing apparatus. In this case, the deposition and sintering processes may be performed by allowing at least one component of the temperature measuring instrument, the preheating burner, and the deposition burner as the components of the manufacturing apparatus to move at a predetermined interval and enabling the independent control of each component with respect to a position to uniformly control the temperature of a mandrel deposition surface.

Meanwhile, according to a conventional technique, when synthetic quartz glass is manufactured through an OVD method or the like as described above, it was common to use silicon chloride ($SiCl_4$) as a source (precursor). However, when silicon chloride ($SiCl_4$) is used as a source, there are problems in that efficiency is low due to a low Si content in the molecule, a large amount of chlorine (Cl) and chlorine-containing gas is generated, and complex treatment facilities are required. On the other hand, according to the present invention, since octamethylcyclotetrasiloxane ($[(CH_3)_2SiO]_4$) is used as a source, there are advantages in that it is more environmentally friendly, and complex treatment facilities are not required.

However, octamethylcyclotetrasiloxane ($[(CH_3)_2SiO]_4$) has problems in that it needs to be vaporized at high temperature due to having a high vaporization temperature and has degraded efficiency by forming a Si-based polymer due to having a complex atomic structure when maintained at high temperature for a long period of time, and an expensive vaporizer is required, and it is necessary to prevent condensation by heating a transfer line to about 180° C. Also, since the heating burner moves in the horizontal direction on the traverse during deposition, a flexible material that withstands high temperature is needed, but there is no suitable material.

Accordingly, in the present invention, the method, in which octamethylcyclotetrasiloxane is supplied to a deposition burner while being sprayed in the form of a droplet along with a high-pressure carrier gas and vaporized by the deposition burner, is used to effectively solve the problems of a conventional technique, which are caused by using octamethylcyclotetrasiloxane.

According to an embodiment of the present invention, since the octamethylcyclotetrasiloxane is supplied to a deposition burner while being sprayed in the form of a droplet through a high-pressure carrier gas and vaporized by the deposition burner, there are advantages in that the equipment structure can be simplified by not requiring a separate vaporizer, line heating is unnecessary, and loss of a raw material can be minimized.

Specifically, the octamethylcyclotetrasiloxane according to an embodiment of the present invention may be supplied to a deposition burner while being sprayed in the form of a droplet through a high-pressure carrier gas, and vaporized by the deposition burner, and the carrier gas may have a pressure range of 1 to 20 SLM (standard liter per minute), specifically, 1 to 15 SLM (standard liter per minute).

Meanwhile, according to an embodiment of the present invention, to increase the decomposition efficiency of octamethylcyclotetrasiloxane ($[(CH_3)_2SiO]_4$) during the deposition process, a halogen element (e.g., chlorine (Cl))-containing gas may be supplied in an amount of 0.1 to 10 parts by weight relative to 100 parts by weight of the octamethylcyclotetrasiloxane. Meanwhile, the chlorine (Cl)-containing gas may be hydrogen chloride (HCl) or chlorine ($Cl_2$) gas, and more specifically, hydrogen chloride (HCl). In this case, although chlorine gas is inevitably used to increase the decomposition efficiency of octamethylcyclotetrasiloxane ($[(CH_3)_2SiO]_4$), a substantially small amount of chlorine is used compared to a conventional method in which silicon chloride ($SiCl_4$) is used as a source (precursor), and thus it is environmentally friendly.

According to the manufacturing apparatus and method of the present invention as described above, in the manufacture of a hollow cylindrical synthetic quartz glass product through an OVD method or the like, it is environmentally friendly in view of not including chlorine and is economical in view of requiring no separate treatment equipment, as compared to a conventional technique using silicon chloride ($SiCl_4$).

In addition, the method, in which octamethylcyclotetrasiloxane is supplied to a deposition burner while being sprayed in the form of a droplet along with a high-pressure carrier gas and vaporized by the deposition burner, can effectively address the high-temperature heating and slow decomposition involved when octamethylcyclotetrasiloxane ($[(CH_3)_2SiO]_4$) is used as a source for depositing silicon dioxide particles.

Meanwhile, as a component of the apparatus for manufacturing synthetic quartz glass utilizing the above method, at least one component selected from the temperature measuring instrument, the preheating burner, and the deposition burner is provided so that it is movable at a predetermined interval and the independent control of each component with respect to a position is possible, and thus the temperature of a mandrel deposition surface can be uniformly controlled, and a deposited material (soot body) having a uniform density can be manufactured. Therefore, the defect rate of the finally manufactured product can be substantially reduced.

In addition, according to the present invention, since a metal mandrel made of stainless steel or the like, which is able to be used in a temperature range of 800 to 1,400° C. which is a $SiO_2$ deposition temperature range and is semi-permanently usable due to having high resistance to thermal shock and less risk of damage, is used in the deposition process in the manufacture of synthetic quartz glass, cracking of a soot body having a specific thickness or more, which results from adhesion between the mandrel and the soot body and stress caused by a difference in the coefficient of thermal expansion between the mandrel and the soot body, can be more effectively addressed, and a deposited material can be prevented from being damaged when separated.

According to the present invention, in manufacture of a hollow cylindrical synthetic quartz glass product through an OVD method or the like, it is environmentally friendly in view of using a smaller amount of chlorine and is economical in view of requiring no separate treatment equipment, as compared to a conventional technique using silicon chloride ($SiCl_4$).

In addition, the method, in which octamethylcyclotetrasiloxane is supplied along with a halogen element-containing gas, deposited under a halogen element-containing atmosphere, or supplied to a deposition burner while being sprayed in the form of a droplet through a high-pressure carrier gas and vaporized by the deposition burner, can effectively address the high-temperature heating and slow decomposition involved when octamethylcyclotetrasiloxane ($[(CH_3)_2SiO]_4$) is used as a source for depositing silicon dioxide particles.

Meanwhile, as a component of the apparatus for manufacturing synthetic quartz glass utilizing the above method, at least one component selected from the temperature measuring instrument, the preheating burner, and the deposition burner is provided so that it is movable at a predetermined interval and the independent control of each component with respect to a position is possible, and thus the temperature of a mandrel deposition surface can be uniformly controlled, and a deposited material (soot body) having a uniform density can be manufactured. Therefore, the defect rate of the finally manufactured product can be substantially reduced.

In addition, according to the present invention, since a metal mandrel made of stainless steel or the like, which is able to be used in a temperature range of 800 to 1,400° C. which is a $SiO_2$ deposition temperature range and is semi-permanently usable due to having high resistance to thermal shock and less risk of damage, is used in the deposition process in the manufacture of synthetic quartz glass, cracking of a soot body having a specific thickness or more, which results from adhesion between the mandrel and the soot body and stress caused by a difference in the coefficient of thermal expansion between the mandrel and the soot body, can be more effectively addressed, and a deposited material can be prevented from being damaged when separated.

As described above, particular exemplary embodiments of the present invention have been described, but the present invention is not limited thereto, and it is clear to those skilled in the art that various modifications and alterations may be made without departing from the spirit and scope of the present invention. Therefore, such modifications and alterations should not be understood separately from the technical spirit and point of view of the present invention but included in the scope of the present invention defined by the appended claims.

What is claimed is:

1. An apparatus for manufacturing synthetic quartz glass, the apparatus comprising:
a cylindrical mandrel including a deposition surface and a porous hollow cylindrical soot body having silicon dioxide ($SiO_2$) particles on the deposition surface of the mandrel;
a temperature measuring instrument provided above the deposition surface on which the silicon dioxide ($SiO_2$) is deposited;
a preheating burner provided on a side of the deposition surface; and
a deposition burner provided below the deposition surface,
wherein at least one of the temperature measuring instrument, the preheating burner, and the deposition burner is configured to move at a predetermined interval, and a position of each of the temperature measuring instrument, the preheating burner, and the deposition burner is independently controllable so as to uniformly control a temperature of the deposition surface,
wherein the deposition burner includes a line mixing console, and wherein the line mixing console has multiple layers such that one of the multiple layers is configured to receive octamethylcyclotetrasiloxane ($[(CH_3)_2SiO]_4$) in the form of a droplet.

2. The apparatus of claim 1, wherein the positions of the temperature measuring instrument and the preheating burner are controlled so that the temperature measuring instrument and the preheating burner move at predetermined intervals in consideration of at least one factor selected from the diameter of the deposition surface, a rotation speed of the mandrel, and a movement speed of the deposition burner, and thus the temperature of the deposition surface is uniformly controlled.

3. The apparatus of claim 1, wherein the preheating burner uniformly controls the temperature of the deposition surface by receiving a temperature value measured with the temperature measuring instrument, calculating a difference from a predetermined target value, and controlling a flow rate of combustion gas of the preheating burner based on the difference.

* * * * *